United States Patent [19]

Kawata

[11] Patent Number: 4,786,164
[45] Date of Patent: Nov. 22, 1988

[54] SYSTEM AND METHOD FOR DETECTING INTERVEHICLE DISTANCE OF TWO VEHICLES MOVING IN THE SAME TRAFFIC LANE

[75] Inventor: Hiroshi Kawata, Yokosuka, Japan

[73] Assignee: Nissan Motor Company, Limited, Kanagawa, Japan

[21] Appl. No.: 754,180

[22] Filed: Jul. 12, 1985

[30] Foreign Application Priority Data

Jul. 13, 1984 [JP] Japan ................. 59-144148

[51] Int. Cl.$^4$ ............................................. G01C 3/08
[52] U.S. Cl. ......................................... 356/4; 356/141; 180/168; 180/169
[58] Field of Search ............... 356/4, 5, 151, 152; 250/211.5; 180/167–169

[56] References Cited

U.S. PATENT DOCUMENTS

| | | | |
|---|---|---|---|
| 3,661,459 | 5/1972 | Aoki | 356/5 |
| 4,477,184 | 10/1984 | Endo | 356/5 |
| 4,621,705 | 11/1986 | Etoh | 364/461 |
| 4,632,543 | 12/1986 | Endo | 356/5 |
| 4,634,272 | 1/1987 | Endo | 356/5 |
| 4,670,845 | 6/1987 | Etoh | 180/169 |

FOREIGN PATENT DOCUMENTS 55-86000  6/1980  Japan .
58-96267  6/1983  Japan .
59-79874  5/1984  Japan .

Primary Examiner—M. H. Paschall
Attorney, Agent, or Firm—Foley & Lardner, Schwartz, Jeffery, Schwaab, Mack, Blumenthal & Evans

[57] ABSTRACT

The system and method for detecting an intervehicle distance to a preceding vehicle which is moving on the same lane as the vehicle, means for radiating and sweeping an electromagnetic wave such as a laser beam toward the moving direction of the vehicle is provided, with the confirmation of a lane on which the vehicle moves on the basis of a comparison of their sweep angles to reflectors located on both ends of a road on which the vehicle moves from a center axis of the vehicle's movement direction, the traffic lane on which a vehicle moving in front of the vehicle moves is determined on the basis of their sweep angles of the electromagnetic wave with respect to the vehicle from the other vehicle moving in front of the vehicle to the reflectors located on both ends of the road and having the same distance to the vehicle as the other vehicle, and the intervehicle distance data is outputted upon determination that both vehicles move on the same traffic lane, a correct intervehicle distance from the vehicle to the preceding vehicle can thus be measured. In addition, the center axis is corrected according to a steering angle of the vehicle's steering wheel.

7 Claims, 5 Drawing Sheets

SYSTEM AND METHOD FOR DETECTING INTERVEHICLE DISTANCE OF TWO VEHICLES MOVING IN THE SAME TRAFFIC LANE

BACKGROUND OF THE INVENTION (1) Field of the Invention

The present invention relates to a system and method for accurately detecting an intervehicle distance to a preceding vehicle moving on the same lane of a road as the vehicle in which the system is mounted in place.

(2) Description of the Prior Art

Systems for detecting an intervehicle distance from a vehicle in which a radar unit is mounted to a preceding vehicle present on the same traffic lane in front of the vehicle and controlling the vehicle speed to always follow the preceding vehicle at a predetermined safe intervehicle distance have conventionally been proposed. One of such conventional systems is exemplified by Japanese Patent Application Unexamined Open No. Sho. 55-86,000 published on June 28, 1980.

In the disclosed conventional system, the radar unit is used in which to measure the intervehicle distance an electromagnetic wave is transmitted toward a forward movement direction of the vehicle, a reflected electromagnetic wave is received from a reflecting object, the intervehicle distance to the preceding vehicle as the reflecting object is measured on the basis of a propagation delay time between times at which the transmission of the electromagnetic wave and reception of the reflected wave are carried out, and the measured intervehicle distance result is sent to a signal processing circuit. The signal processing circuit compares the measured intervehicle distance result with a safe intervehicle distance corresponding to a vehicle speed detected from a vehicle speed sensor and control an opening angle of a throttle valve installed in an engine of the vehicle via an actuator for independently actuating the throttle valve so as to maintain the distance to the preceding vehicle at the safe intervehicle distance. However, since an orientation of the electromagnetic wave transmitted from the radar unit in the above-described conventional system is in general limited within a narrow area in the forward direction of the vehicle, it is difficult to determine whether a wave reflecting object is really a preceding vehicle moving on the same lane or another forwarding vehicle moving on a different (adjacent) lane, e.g., when the vehicle is traveling on a curved road.

Therefore, the conventional system disclosed in the above identified document determines erroneously that the preceding vehicle moving on the adjacent lane is that moving on the same lane and accelerates or decelerates the vehicle inappropriately according to the erroneous intervehicle distance.

On the other hand, another similar system has been proposed in which, e.g., a laser beam transmitted from the radar is scanned within a predetermined range and a reflecting object of the laser beam within the predetermined range is detected.

This is exemplified by Japanese Patent Application Unexamined Open No. Sho. 58-96,267 published on June 8, 1983.

However, if such the conventional laser beam radar unit is applied to the previously described intervehicle distance controlling system, it is similarly difficult to determine whether the detected reflecting object is really a preceding vehicle moving on the same traffic lane. Consequently, the appropriate control of the vehicle speed cannot be achieved in the similar way.

SUMMARY OF THE INVENTION

With the above described problem in mind, it is an object of the present invention to provide a system and method for detecting the intervehicle distance wherein an accurate determination of presence of the preceding vehicle moving on the same lane can be made, and the intervehicle distance to the preceding vehicle can be measured without error.

The above-described object can be achieved by providing the system comprising: (a) first means for transmitting an electromagnetic wave toward a direction along which the vehicle moves and sweeping the transmitted electromagnetic wave from a vehicle forward movement direction to both predetermined left and right direction limits, (b) second means for receiving a reflected wave from a reflecting object on which the electromagnetic wave transmitted from the first means falls, (c) third means for calculating and storing a distance to the reflecting object on the basis of a propagation delay time between a time at which the first means transmits the wave and a time at which the second means receives the reflected wave whenever the first means sweeps the transmitted wave at a given angle, (d) fourth means for determining on which traffic lane of a road the vehicle moves on the basis of respective sweep angles of the transmitted and reflected electromagnetic wave between a center axis which accords with the vehicle forward movement direction and wave reflecting objects present on both sides of the road, (e) fifth means for determining whether another vehicle is present on the road along a direction area toward which the vehicle moves from among the wave reflecting objects on the basis of a change in the distance derived for each given sweep angle with respect to time, (f) sixth means for determining a traffic lane of the road on which the other vehicle determined by the fifth means moves on the basis of their sweep angles of the transmitted and reflected wave between the center axis and each reflecting object present on the corresponding side of the road, each reflecting object having the same distance as the intervehicle distance to the other vehicle, and (g) seventh means for outputting a value of the intervehicle distance from the vehicle to the other vehicle calculated and stored by the third means upon determination of the sixth means that the other vehicle determined by the fifth means is the preceding vehicle which is moving in front of the vehicle on the same traffic lane of the road as the vehicle.

BRIEF DESCRIPTION OF THE DRAWINGS

A more complete understanding of the present invention may be obtained from the foregoing description taken in conjunction with the attached drawings in which like reference numerals designate corresponding elements and in which.

DETAILED DESCRIPTION OF THE PREFERRED EMBODIMENT

Reference will hereinafter be made to the drawings in order to facilitate understanding of the present invention.

Figure 1:
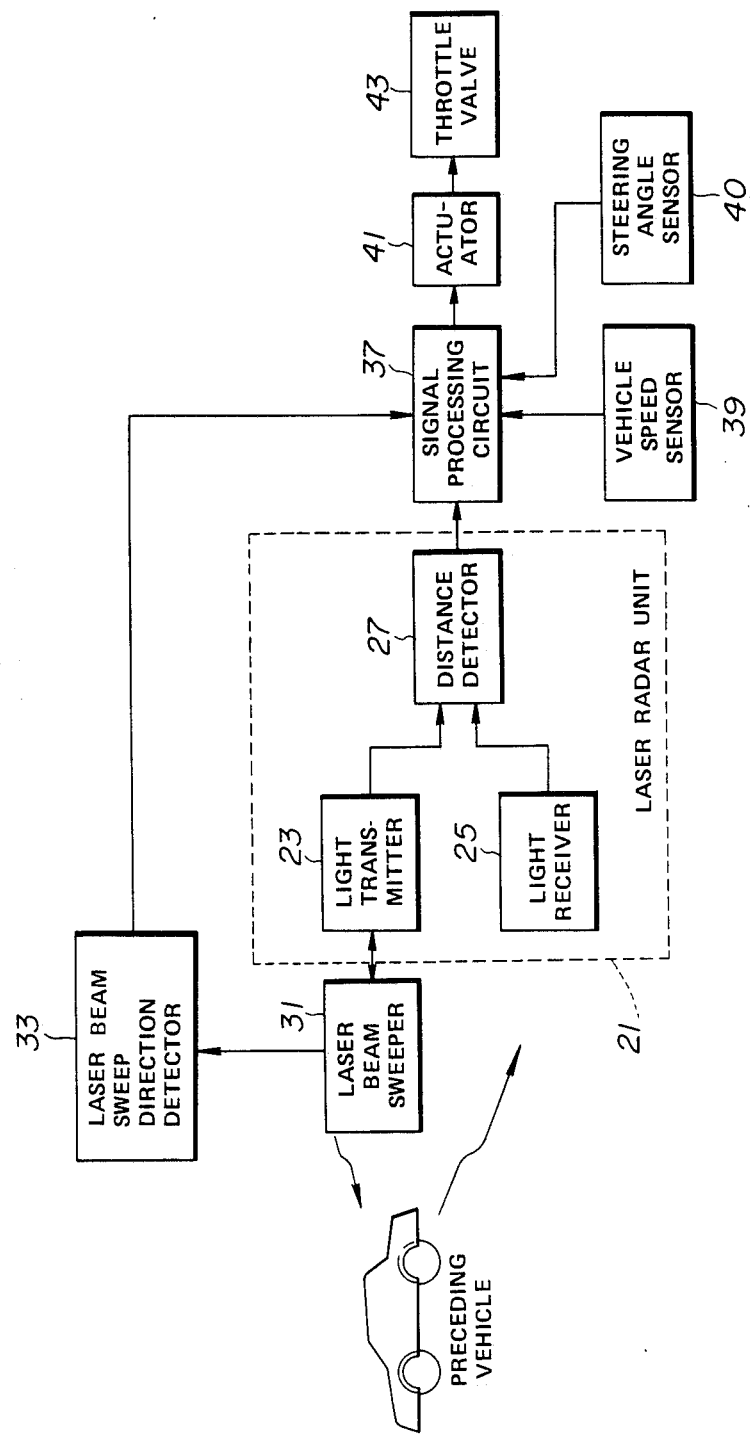
FIG. 1 is a simplified block diagram of a preferred embodiment of the intervehicle distance detection system according to the present invention.

FIG. 1 shows a preferred embodiment according to the present invention.

The intervehicle distance detecting system shown in FIG. 1 comprises a radar unit 21 including a light transmitter 23 which transmits a laser beam, a light receiver 25 which receives a reflected laser beam of the transmitted light beam reflected on an object, and a distance detection circuit 27 which detects a distance to a beam reflecting object on the basis of a propagation delay time of the laser beam between the times at which the laser beam is transmitted and at which the laser beam reflected by the object is received. It should be noted that the laser beam transmitted from the light transmitter 23 is swept toward left and right directions with respect to the vehicle forward movement direction by means of a laser beam sweeper 31. The laser beam sweeper 31 sweeps the light beam at a frequency of about 10 Hertz, e.g., with a given angle of about ±10 degrees with respect to the straight direction, (vehicle forward movement direction) e.g., using a mirror.

The sweeping angle of the laser beam sweeper 31 is detected by means of a laser beam sweeping direction detector 33 and sent to the signal processing circuit 37. The laser beam sweeping direction detector 33 can detect the sweeping angle by counting the number of pulses which drive a step motor if the step motor is used as means for controlling the mirror of the above-described laser beam sweeper 31.

If a galvanometer is used as the laser beam sweeper 31, the sweeping angle can be detected from a signal for controling the galvanometer.

The signal processing circuit 37 detects accurately the preceding vehicle moving on the same traffice lane on the basis of the distance data derived from the distance detection circuit 27 of the above-described radar unit 21 and the sweeping angle data derived from the laser beam sweeping direction detector 33, compares the intervehicle distance to the detected preceding vehicle with a predetermined safe intervehicle distance corresponding to the vehicle speed detected by means of a vehicle speed sensor 39, and controls a throttle valve 43 via the actuator 41 on the basis of a difference between both intervehicle distance values so that the vehicle speed is controlled to maintain the intervehicle distance to the preceding vehicle at the safe intervehicle distance.

The above-described light transmitter 23 outputs a laser beam in a slender-shaped ellipse or rectangular form having a vertical laser divergence angle of approximately four degrees and has a horizontal laser divergence angle of approximately 0.3 degrees.

Figure 2:
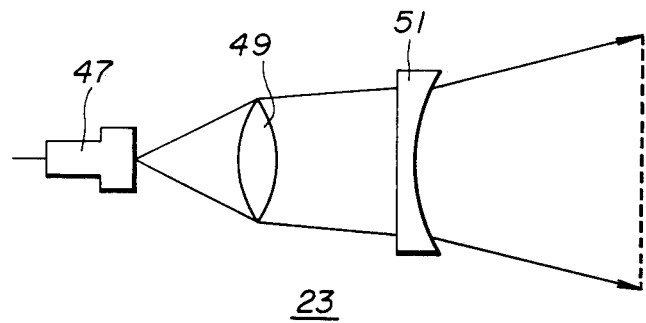
FIG. 2 is an explanatory view of a light transmitter used in the system shown in FIG. 1.

For example, the laser beam outputted from a laser diode 47 as shown in FIG. 2 is diverged by means of a convex lens 49 to form a beam having a divergence of about 0.3 degrees and thereafter is outputted as the laser beam having the vertical divergence angle of about four degrees by means of a cylindrical recess lens 51. In this way, since the laser beam is diverged in a vertically elongated ellipse form or in a vertically long rectangular form, the laser light transmitter 23 can direct the laser beam accurately on an object located in front of the vehicle over a wide range even when the vehicle moves on an asending road. In addition, since the horizontal divergence of the laser beam is narrow, the system shown in FIG. 1 can accurately detect the angle of the single object with respect to the forward movement of the vehicle.

Such a vertically long laser beam is transmitted toward left and right directions with the movement direction of the vehicle as a center by means of the above-described laser beam sweeper 31. The light receiver 25 receives the laser beam reflected from a reflecting object present in a front detection area, converts the received light beam into a corresponding electrical signal, amplifies the electrical signal and sends it the above-described intervehicle distance detection circuit 27.

Figure 3:
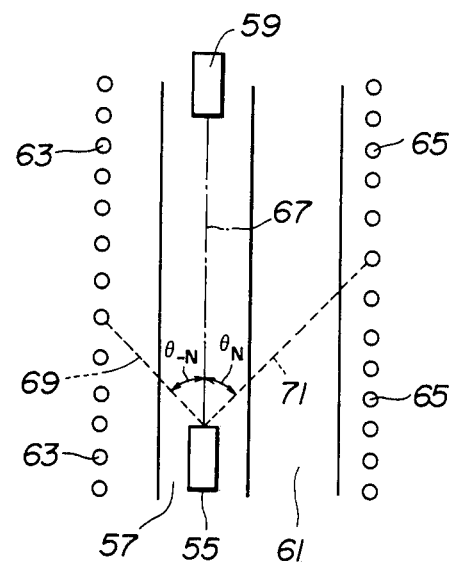
FIGS. 3 through 5 are explanatory views for explanation of a theory of detection of the present invention.

FIG. 3 shows a sweeping direction of the laser beam transmitted from the light transmitter 23. The laser beam is swept by the laser beam sweeper 31.

As shown in FIG. 3, the laser beam is swept at the left direction through an angle of $\theta_{-N}$ upon arrival at a position 69 denoted by a broken line and at the right direction through an angle of $\theta_N$ upon arrival at a position 71 denoted by a broken line with respect to a center position 67, i.e., vehicle forward direction denoted by a dot-and-dash line.

In FIG. 3, both vehicle 55 in which the system shown in FIG. 1 is mounted and preceding vehicle 59 are moving on the same lane 57 and no preceding vehicle is present in a right-side (inside) lane 61 (in Japan, such a lane 61 is usually called a passing lane).

In addition, a plurality of reflectors 63 are installed at certain intervals along a left-side shoulder and a plurality of reflectors 65 are furthermore installed at certain intervals along a median at a right-side of the inside lane 61.

In general, when the laser beam is swept from the vehicle 55 toward the left and right directions with the vehicle moving direction as a center as shown in FIG. 3, such a radar unit can detect the preceding vehicle 59, the plurality of reflectors 63, 65 installed at the shoulder and the median, and guard rails installed on the left shoulder and on the median adjacent to each reflector 63, 65 or supporting these respective reflectors 63, 65.

Although these reflectors 63, 65 in general have high light reflectivities and the radar unit can detect such reflectors remotely located therefrom, the guard rails has relatively low light reflectivities so that the radar unit can detect such guard rails only if they are not remotely located therefrom. Therefore, such guard rails are omitted in FIG. 3 for simplicity and only such reflectors are depicted in FIG. 3.

It should be noted in a freeway in Japan each width of the outside and inside lanes 57, 61 is about 3.5 meters, a distance from a position of the left-side shoulder along which the reflectors 63 are installed to a leftmost position of the outside lane 57 is 1.2 meters through 2.5 meters, and a distance from a position of the median along which the reflectors 65 are installed to a rightmost position of the inside lane 61 is 0.75 meters through 1.25 meters.

Next, a theory of determining the presence of the preceding vehicle 59 will be described below.

Figure 4:
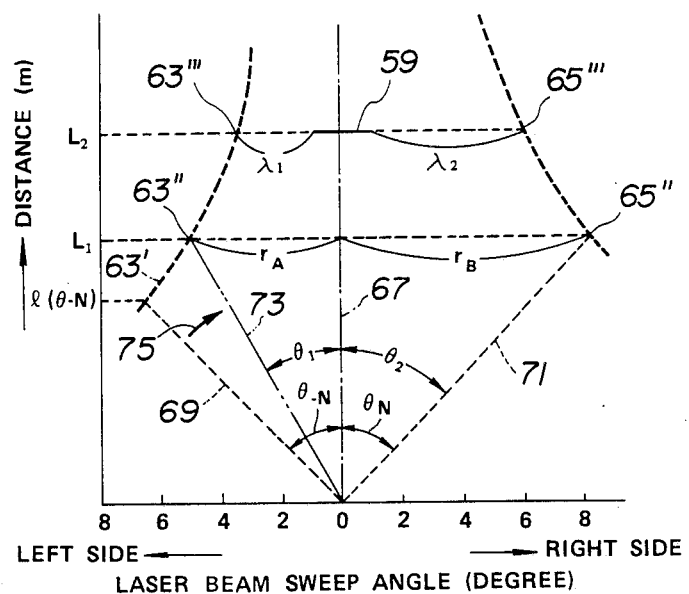

FIG. 4 shows a graph representing a laser beam reflecting object detected by sweeping the transmitted laser beam from a predetermined location of the vehicle 55 shown in FIG. 3 in which the radar unit 21 is mounted and receiving the reflected laser beam in terms of the corresponding sweep angle with respect to the center position 67 and distance position at which the laser beam reflecting object is located. In FIG. 4, an axis of the abscissa indicates the sweep angle of the laser beam and axis of the ordinate indicates the detected distance from the vehicle 55 to the reflecting object.

As described above, the sweep angle of the laser beam is defined as a position corresponding to the center line 67 at which the vehicle 55 is present to be zero degree and the laser beam is swept toward the right direction through the maximum angle of $\theta_N$ with respect to the center line 67 shown in FIG. 3 which as described above accords with the movement direction of the vehicle 55 and toward the left direction through the maximum angle of $\theta_{-N}$ with respect to the center line 67.

When the laser beam is swept through the maximum angle of $\theta_N$ from the center line 67, a rightmost line 71 shown in FIGS. 3 and 4 of the laser beam falls on one 65″ of the right-side reflectors 65.

As appreciated from FIG. 4, the distance to that reflector 65″ is $L_1$.

On the other hand, when the laser beam is swept through the maximum angle of $\theta_{-N}$ from the center line 67, a leftmost line 69 shown in FIGS. 3 and 4 of the laser beam falls on one 63′ of the left-side reflectors 63. As appreciated from FIG. 4, the distance to that reflector 63′ is $l(\theta_{-N})$.

Suppose now that the sweep angle of the laser beam between the above-described reflector 65″ and center line 67 is $\theta_2$ and that the sweep angle thereof between another reflector 63″ which is located at the same distance as the distance $L_1$ to the above-described right-side reflector 65″ is $\theta_1$, it is clearly understood that the sweep angle $\theta_1$ to the left-side reflector 63″ is smaller than the sweep angle $\theta_2$ to the right-side reflector 65″.

In this way, if the respective sweep angles $\theta_1$ and $\theta_2$ with respect to the left-side reflector 63″ and right-side reflector 65″ located at the same distance $L_1$ from the vehicle 55 are detected and a ratio between both sweep angles $\theta_1$ and $\theta_2$ is calculated, the system according to the present invention can determine whether the vehicle 55 moves on the outside lane 57 or on the inside lane 61. In this case, while the vehicle moves on the inside lane 61, the sweep angle $\theta_1$ from the center line 67 to the left-side reflector 63″ is greater than the sweep angle $\theta_2$ from the center line 67 to the right-side reflector 65″. Alternatively, with each distance $\delta_A$ and $\delta_B$ from the left-side and right-side reflectors 63″ and 65″ to a center position of the line 67 calculated on the basis of the above-described sweep angle $\theta_1$ and $\theta_2$, as shown in FIG. 4, the above-described determination of the moving lane of the vehicle 55 may be made.

After such a determination is carried out, the system determines whether a preceding vehicle 59 is moving on the outside lane 57 or on the inside lane 61 in a similar manner.

In more detail, if the laser beam detects that the preceding vehicle 59 is present in a position of $L_2$ shown in FIG. 4, the radar unit detects one 63‴ of the left-side reflectors 63 and one 65‴ of the right-side reflectors 65 both of which are located at the same distance as the distance $L_2$ and the sweep angles $\lambda_1$ and $\lambda_2$ are detected from a position of the center line 67 to the respective reflectors 63‴ and 65‴. That is to say, when the preceding vehicle 59 runs on the outside lane 57 as shown in FIG. 3, the sweep angle $\lambda_1$ is smaller than the sweep angle $\lambda_2$. The relationship of the ratio between these sweep angles $\lambda_1$ and $\lambda_2$ is substantially the same as that of the ratio between the above-described sweep angles $\theta_1$ and $\theta_2$. Consequently, if these ratio relationships are substantially the same, the preceding vehicle 59 is moving on the same lane, i.e., in this case, on the outside lane 57 shown in FIG. 3. In addition, if the preceding vehicle 59 is moving on the inside lane 61 which is different from the lane on which the vehicle 55 is moving, the sweep angle $\lambda_1$ from the preceding vehicle 59 to the left-side reflector 63‴ with respect to the vehicle 55 is greater than the sweep angle $\lambda_2$ from the preceding vehicle 59 to the right-side reflector 65‴ with respect to the vehicle 55. Since the ratio of the angles between the sweep angles $\lambda_1$ and $\lambda_2$ is different from that between the sweep angles $\theta_1$ and $\theta_2$, the preceding vehicle 59 can be determined to be moving on the different lane. As described above, the above-described determination can be based on the distances to the preceding vehicle of both reflectors at the same distance as the preceding vehicle corresponding to the sweep angles $\lambda_1$ and $\lambda_2$. In this embodiment, the radar unit determines whether the preceding vehicle is moving on the same lane or on a different lane on the basis of laser beam sweep angles to the above-described reflectors located on the same distances from the vehicle.

It is noted that the above-described theory of the detection is explained in a case when the vehicle 55 moves along the straight road shown in FIG. 3. Next, in a case when the vehicle moves along a curved road, a slight correction needs to be made on the basis of a steering angle through which the vehicle moving direction is accordingly changed.

Figure 5:
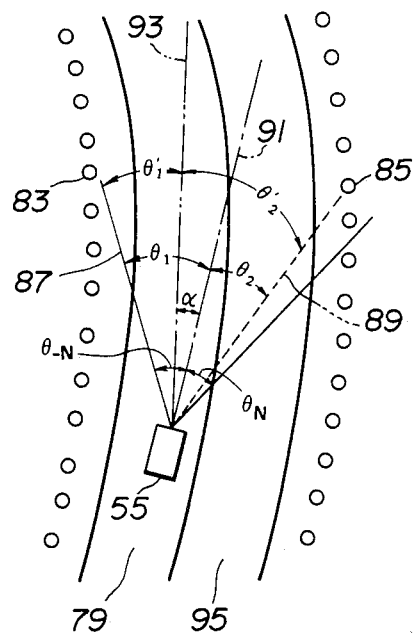

FIG. 5 shows a situation in which the vehicle 55 moves along a left curved road.

In FIG. 5, the sweep angle $\theta_2$ between a center line 91 denoted by a dot-and-dash line extending along the forward movement direction of the vehicle 55 and the laser beam 89 against a right-side reflector 85 located at the same distance as a left-side reflector 83 which is detected by the laser beam 87 swept through the angle of $\theta_1$ toward the left direction with respect to the center line 91 is smaller than the above-described sweep angle $\theta_1$ derived in the case of the movement on the straight road, the radar unit determines erroneously that the vehicle 55 is moving on the outside lane 95. In such a case, if the center line 91 for the vehicle movement direction is corrected as denoted by numeral 93 (in a phantom line) shown in FIG. 5 on the basis of the steering angle a of the vehicle 55 with respect to an equilibrium position of the steering wheel (not shown), the sweep angle of the left-side reflector 83 with respect to the corrected center line 93 is changed as $\theta_1'$ and the sweep angle of the right-side reflector 83 with respect to the corrected center line 93 is also changed as $\theta_2'$. When such a correction is carried out, the sweep angle $\theta_1'$ is smaller than the sweep angle $\theta_2'$. Therefore, the vehicle 55 can accurately be determined to be moving on the inside lane 79 from such the angular relationship between the corrected sweep angles $\theta_1'$ and $\theta_2'$.

It should be noted that the steering angle a is derived from a steering angle sensor 40 shown in FIG. 1. The structure of the steering angle sensor 40 is exemplified by U.S. Ser. No. 309,012 filed on Oct. 5, 1981 (U.S. Pat. No. 4,450,438 issued on May 22, 1984) and Ser. No. 304,254 filed on Sept. 21, 1981 (U.S. Pat. No. 4,463,347 issued on July 31, 1984), the contents of which are hereby incorporated by reference.

Next, an operation of the preferred embodiment will be described with reference to an operational flowchart integrally shown in FIGS. 6(A) and 6(B).

Figure 6:
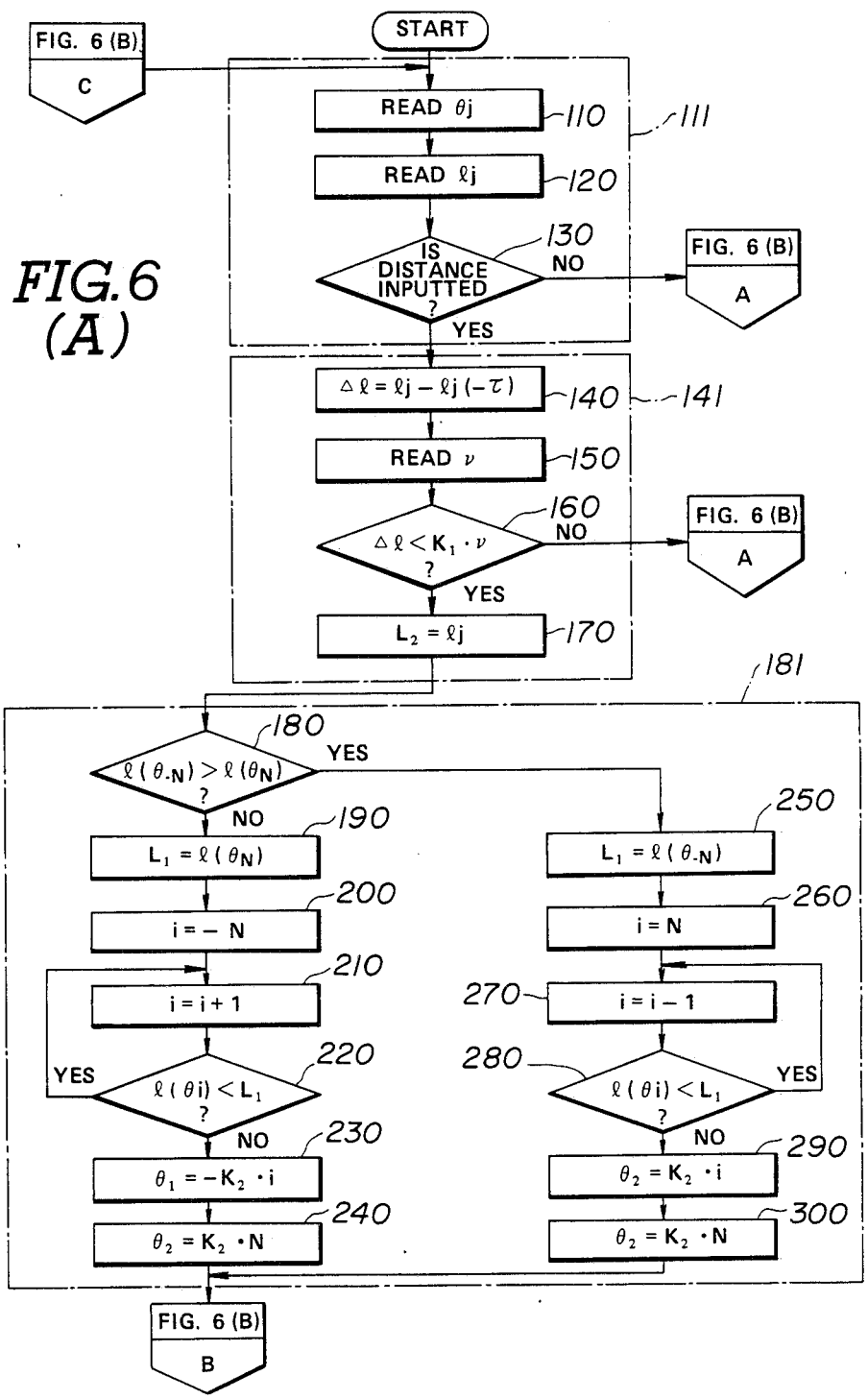
FIGS. 6(A) and 6(B) are integrally an operational flowchart for explaining an operation of the preferred embodiment shown in FIG. 2.
Figure 6:
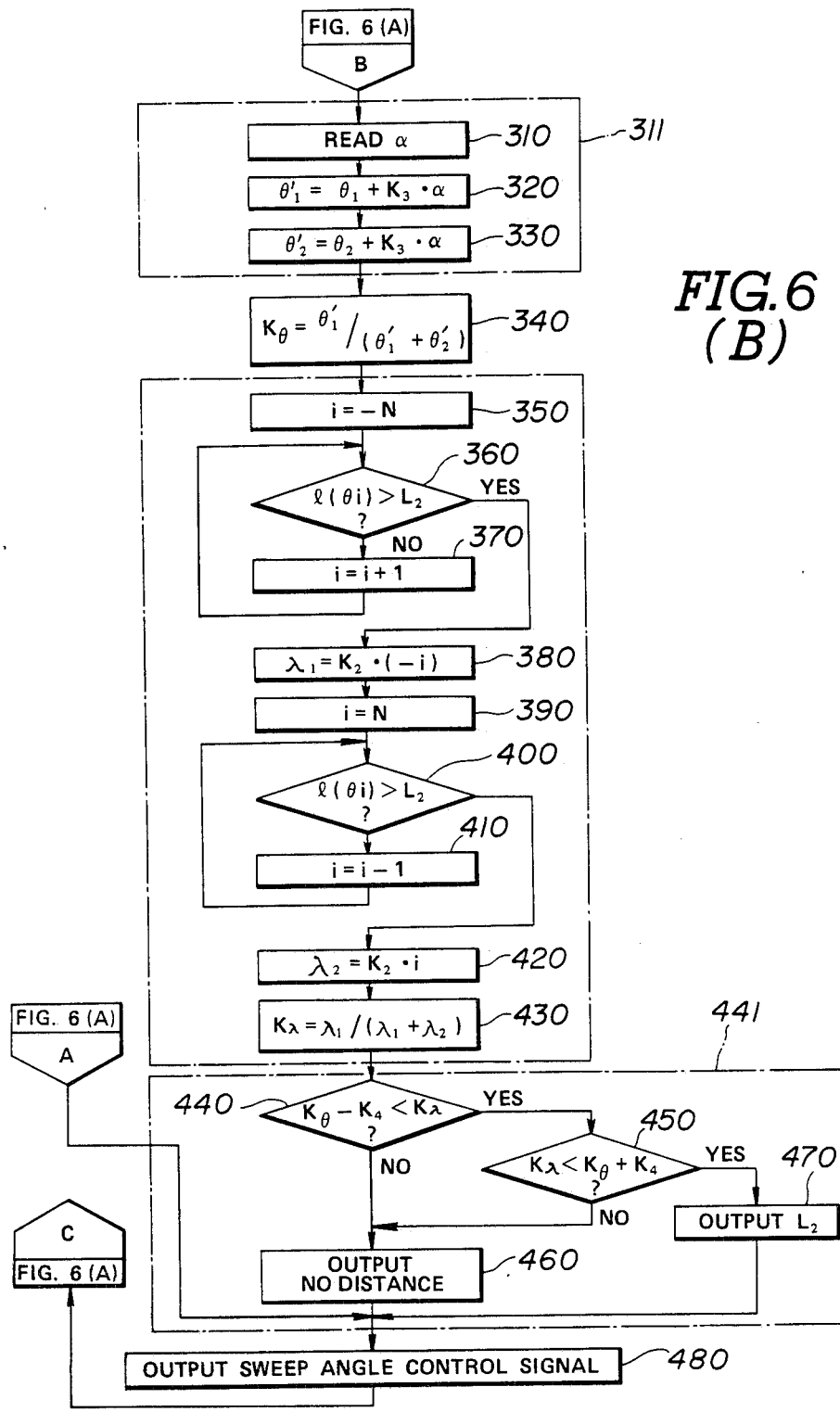

The integral flowchart shown in FIGS. 6(A) and 6(B) is roughly divided into eight stages: a reflecting object detection stage 111; a preceding vehicle identification stage 141; a vehicle position-and-angle detection stage 181; a steering angle correction stage 311; a vehicle position-and-angle ratio calculation stage 351; a preceding vehicle determination stage 441; and a sweep angle control signal output stage 480.

The reflecting object detection stage 111 comprises steps for determining whether a light reflecting object is present in front of the vehicle from a reflected laser beam outputted in front of the vehicle. If the presence of the reflecting object is detected in the stage 111, the routine goes to the preceding vehicle identification stage 141 wherein the system determines whether the detected reflecting object is a forwarding vehicle moving in front of the vehicle (including the preceding vehicle moving in the same traffic lane).

If the forwarding vehicle is detected, the routine goes to the vehicle position and angle detection stage 181, wherein the sweep angles $\theta_1$ and $\theta_2$ described with reference to FIG. 4 and FIG. 5 are calculated in order to determine on which traffic lane of the road the vehicle 55 is moving.

The calculated sweep angles $\theta_1$ and $\theta_2$ are corrected using the steering angle in the next steering angle correction processing stage 311.

In the vehicle position-and-angle ratio calculating stage 340, the ratio of corrected sweep angles is calculated with reference to the steering angle position a.

The ratio of the vehicle position-and- angle ratio calculating stage 340 in which the traffic lane of the road on which the vehicle 55 is moving is identified. The traffic lane on which the forwarding vehicle is moving is estimated as the ratio of angle from the sweep angles $\lambda_1$ and $\lambda_2$ described above with reference to FIG. 4.

If in the preceding vehicle determination stage 441 the calculated preceding vehicle position-and-angle ratio is compared with the previously calculated vehicle position-and-angle ratio, the system can identify that the forwarding vehicle moving in front of the vehicle is the preceding vehicle which is moving on the same traffic lane as the vehicle 55. Consequently, the detected distance data is outputted as the inter-vehicle distance data.

The detailed processing steps in the integral flowchart shown in FIGS. 6(A) and 6(B) will be described below.

In the reflecting object detection stage 111, the routine goes to a step 110, wherein the system reads via the laser beam sweep direction detector 33 the sweep angle $\theta_j$ of the laser beam outputted via the laser beam sweeper 31.

In the next step 120, the light receiver 25 receives the outputted and reflected laser beam and the distance detector 27 calculates and reads the distance $l_j$ on the basis of the above-described propagation delay time.

Such a sweep operation of the laser beam is carried out continuously through the angle from the maximum angle $\theta_{-N}$ in the left direction with respect to the center line 67 of the vehicle moving direction to the other maximum angle $\theta_N$ in the right direction $\theta_N$ as shown in FIG. 3.

In the next step 130, the signal processing circuit 37 determines whether there is an input of the distance data, i.e., whether the light receiver 25 receives the reflected light from any reflecting object which is present in the forward direction of the vehicle 55. If there is no input of the distance data, i.e., if no reflecting object is present in front of the vehicle, the routine goes to a step 480, wherein the sweep angle control signal is outputted from the laser beam sweeper 31 to move the sweeping direction of the transmitted laser beam.

If there is an input of the distance data in the step 130, the routine goes to a step 140 to determine whether the detected reflecting object is a vehicle which moves in front of the vehicle. In the step 140, the difference in distance $\Delta l$ is calculated as follows:

$$\Delta l = l_j - l_j(-\tau)$$

wherein $l_j$ denotes the currently detected distance and $l_j(-\tau)$ denotes the distance to the reflecting object detected in the direction of the same angle before $\tau$ second of a constant time period. In the next step 150, the circuit 37 reads the vehicle speed from the vehicle speed sensor 39.

Although the calculated distance difference $\Delta l$ is a distance corresponding to the vehicle speed if, e.g., the reflecting object is such a fixed object as one of the reflectors installed on the shoulder of a road, the calculated distance difference $\Delta l$ indicates substantially zero if the detected reflecting object is such a moving object as the forwarding vehicle which is moving in the same direction of movement as the vehicle 55. In addition, a relative speed of the forwarding vehicle to the vehicle 55 is generally slower than the speed of the vehicle 55 although the speed of the forwarding vehicle which is moving in front of the vehicle is not the same as that of the vehicle 55. Therefore, in a step 160, the signal processing circuit 37 compares a value of the read vehicle speed V by which a constant number $K_1$ is multiplied with the difference in distance $\Delta l$. If $\Delta l < v \times K_1$ in the step 160, the routine goes to a step 170, wherein the value $l_j$ detected in the step 120 is set as the distance to the forwarding vehicle $L_2$. On the other hand, if $\Delta l \geq v \times K_1$ in the step 160, the routine goes to a step 480 to initiate the subsequent sweeping operation since the detected reflecting object is not a preceding vehicle moving in front of the vehicle.

After the value $l_j$ is set as the distance $L_2$, the routine goes to the vehicle distance-and-angle detection stage 181, wherein the sweep angles $\theta_1$ and $\theta_2$ shown in FIG. 4 are calculated to determine the position of the vehicle 55 on the moving road.

In a step 180, the circuit 37 calculates the distance $l(\theta_{-N})$ to the left-side reflector detected at the time of the maximum sweep angle $\theta_{-N}$ when the laser beam is swept in the left direction and distance $l(\theta_N)$ to the right-side reflector detected at the time of the maximum sweep angle $\theta_N$ when the laser beam is swept in the right direction. The left-side reflector detected by the leftmost laser beam line 69 swept through the maximum sweep angle $\theta_{-N}$ is that indicated by numeral 63' as shown in FIG. 4.

In a case when in the step 180 the right-side reflector detected by the rightmost laser beam line 71 swept through the maximum sweep angle $\theta_N$, e.g., is that indicated by numeral 65" is longer than that to the routine goes to a step 190 since the distance to the right-side reflector 65" is longer than that to the left-side reflector 63'. In the step 190, the distance $l(\theta_N)$ to the right-side reflector 65" is set as the distance $L_1$. In the next steps 200, 210, 220, and 230, the circuit 37 detects the sweep angle $\theta_1$ to the left-side reflector 63" located at the same distance as the distance $L_1$ to the right-side reflector 65" detected in the above-described way.

That is to say, in the step 200, $-N$ is set as a variable i and in the step 210, the variable i is incremented by one so that the distance $l(\theta_i)$ to the sweep angle $\theta_i$ corresponding to the variable i is detected. In the step 220, the distance $l(\theta_i)$ is compared with the distance $L_1$.

If the distance $l(\theta_1)$ is smaller than the distance $L_1$, the routine returns to the step 210 wherein the variable i is further incremented by one.

The above-described routine is repeated until the distance $l(\theta_i)$ becomes equal to the distance $L_1$. That is to say, in the case when $-N$ is set as the variable i, the distance $l(\theta_{-N})$ with respect to the left-direction maximum sweep angle $\theta_{-N}$ in FIG. 4 is compared with the distance $L_1$.

In this case, the distance $l(\theta_{-N})$ is shorter than the distance $L_1$ as appreciated from FIG. 4. However, the sweep angle is gradually increased toward the center line 67 by the incrementation in the step 210 so that the sweep direction of the laser beam, as shown by the arrow mark 75 in FIG. 4, is moved toward the direction denoted by numeral 73 in the phantom line, the sweep angle of the laser beam indicates $\theta_1$, and the distance $l(\theta_i)$ becomes equal to the distance $L_1$ when the left-side reflector 63" is detected. Consequently, the routine goes to the subsequent step 230. Since the variable i indicates negative value at this time, a value of the negative variable by which a coefficient $K_2$ which corresponding to a unit angle is multiplified ($-K_2 \times i$) is set as the above-described sweep angle $\theta_1$. In addition, since the sweep angle $\theta_2$ is the maximum sweep angle $\theta_N$ in the right direction with respect to the vehicle movement direction, the value of a coefficient $K_2$ by which N is multiplied ($K_2 \times N$) is set as the sweep angle $\theta_2$ in steps 220 and 240.

It should be noted that if the distance $l(\theta_{-N})$ is greater than the distance $l(\theta_N)$ in the step 180, the routine goes to the step 250, wherein the same processing as the steps 190 through 240 is carried out in the case i=N.

In the next steering angle correction stage 311, the steering angle value $\alpha$ is read from the steering sensor 40 in a step 310.

In the next steps 320 and 330, a constant number $K_3$ by which the value of steering angle $\alpha$ is multiplied (the multiplied value indicates to what degree the vehicle movement direction is changed) is added to the sweep angles $\theta_1$ and $\theta_2$, respectively, to derive the corrected sweep angles $\theta_1'$ and $\theta_2'$ shown in FIG. 5.

In the next step 340, the signal processing circuit 37 calculates the vehicle positional angle value ratio $K_\theta$ on the basis of the corrected sweep angles $\theta_1'$ and $\theta_2'$ with respect to the steering angle value $\alpha$.

The routine goes then to the vehicle positional angle ratio detection stage 351.

The sweep angles $\theta_1$ and $\theta_2$ with respect to the left-side reflector 63''' and right side reflector 65''' located at the same distance as the distance $L_2$ to the forwarding vehicle moving in front of the vehicle set in the step 170 are detected and the ratio between those sweep angles $\lambda_1$ and $\lambda_2$ is calculated (refer to FIG. 4) in this stage.

In this stage, to detect the above-mentioned sweep angle $\lambda_1$, the same processing as in the steps 200 through 230 is carried out in steps 350 through 380. That is to say, $-N$ is set corresponding to the maximum sweep angle $\theta_{-N}$ in the left direction as the variable i in the step 350. In the step 360, the distance $l(\theta_i)$ to the left-side reflector detected in the sweep angle corresponding to the variable i is compared with the distance $L_2$.

In the next step 370, the variable i is incremented by one. The processing is repeated until the distance $l(\theta_i)$ reaches the distance $L_2$. In the step 380, if $l(\theta_i) = L_2$, the variable $-i$ by which the constant number $K_2$ is multiplied is set as $\lambda_2$. For the sweep angle $\lambda_2$, the same processing is repeated in steps 390 through 420. It should be noted that N is set in place of $-N$ as the variable i and the variable i is decremented by one (not incremented by one). The ratio $K_\lambda$ of the vehicle positional angles moving in front of the vehicle is calculated in a step 430 on the basis of the sweep angles $\lambda_1$ and $\lambda_2$. Both ratios $K_\lambda$ and $K_\theta$ of the positional angles of the respective vehicles are substantially the same if the vehicle moving in front of the vehicle moves on the same lane as the vehicle ($K_\theta = K_\lambda$). Hence, the ratio of angle $K_\theta$ is compared with the other ratio $K_\lambda$ in order to determine whether both vehicles are moving on the same lane. However, since these angle ratios have error allowable width (tolerance), a width is provided for the angle ratio $K_\theta$ as the error allowable width $K_4$. In steps 450 and 460, the circuit 37 determines whether inequalities of $K_\theta - K_4 < K_\lambda < K_\theta + K_4$ are satisfied. That is to say, if the value $K_\lambda$ is greater than $K_\theta - K_4$ and the value $K_\lambda$ is smaller than $K_\theta + K_\lambda$, the value of ratio $K_\lambda$ falls within the value of ratio $K_\theta$ with the error width taken into consideration so that the circuit 37 determines that the vehicle is the preceding vehicle which is moving on the same lane as the vehicle. Thereafter, the routine goes to a step 470, wherein the distance value $L_2$ to the vehicle moving in front of the vehicle is outputted as the intervehicle distance $L_2$ to the preceding vehicle. Then, the routine goes to the step 480.

On the other hand, if the ratio of angle $K_\lambda$ is smaller than $K_\theta - K_4$ or greater than $K_\theta + K_4$, the circuit 37 determines that the forwarding vehicle moving in front of the vehicle is not the preceding vehicle moving on the same lane and outputs no intervehicle distance value. Then, the routine goes to the step 480. In the step 480, the subsequent sweep angle control signal is outputted to return to the initial step 110.

As described above, since the system according to the present invention can detect accurately the intervehicle distance to the preceding vehicle which is moving on the same traffic lane as the vehicle 55, the vehicle speed control system associated with the above system can control the vehicle speed on the basis of the relative speed to the preceding vehicle which is derived from the differentiation of the change in the detected intervehicle distance and predetermined safe intervehicle distance derived from the vehicle speed via the actuator 41 and throttle valve 43 so that the intervehicle distance is maintained at the safe intervehicle distance. Such a vehicle speed control system is exemplified by U.S. patent application Ser. No. 658,529 filed on Oct. 9th, 1984 and Japanese Patent Unexamined Open No. Sho. 55-86,000 the contents of which are hereby incorporated by reference.

As described hereinabove, since in the system and method for detecting an intervehicle distance to a preceding vehicle which is moving on the same lane as the vehicle according to the present invention, means for radiating and sweeping an electromagnetic wave toward the moving direction of the vehicle is provided, with the confirmation of a lane on which the vehicle moves on the basis of a comparison of their sweep angles to reflectors located on opposite sides of the road from a center axis of the moving direction, the traffic lane on which a vehicle moving in front of the vehicle moves is determined on the basis of their sweep angles of the electromagnetic wave with respect to the vehicle from the other vehicle moving in front of the vehicle to the reflectors located on the opposite sides of the road and having the same distance as the other vehicle, and the intervehicle distance data to the other vehicle is outputted upon determination that both vehicle moves on the same traffic lane and the other vehicle is preceding vehicle, the correct intervehicle distance to the preceding vehicle can be measured.

When the system is applied to such an automatic vehicle speed control system, an appropriate control of the vehicle speed can be achieved. Consequently, a highly reliable control of the intervehicle distance can be attained.

It will be clearly understood by those skilled in the art that the description has been made in terms of the preferred embodiment and various changes may be made without departing from the scope and spirit of the present invention, which is to be defined by the appended claims.

What is claimed is:

1. A system for detecting an inter-vehicle distance between first and second vehicles travelling on a road having a plurality of traffic lanes, comprising:
   (a) first means for transmitting an electromagnetic wave toward said second vehicle along a direction of forward movement of the first vehicle and sweeping the transmitted electromagnetic wave from the first vehicle forward movement direction to both predetermined left and right direction limits;
   (b) second means for receiving a reflected wave from a reflecting object on which the electromagnetic wave transmitted from said first means falls;
   (c) third means for calculating and storing a distance to the reflecting object on the basis of a propagation delay time between a time at which said first means transmits the wave and a time at which said second means receives the reflected wave whenever said first means sweeps the transmitted wave at a given angle;
   (d) fourth means for determining on which traffic lane of a road the first vehicle moves on the basis of respective sweep angles of the electromagnetic wave transmitted by said first means and received by said second means between a center axis which accords with the first vehicle's forward movement direction and wave reflecting objects present on both sides of the road;
   (e) fifth means for determining whether the second vehicle is present on the road along a direction area toward which the first vehicle moves from among the wave reflecting objects on the basis of a change in the distance derived for each given sweep angle with respect to time;
   (f) sixth means for determining a traffic lane of the road on which the second vehicle determined by said fifth means moves on the basis of sweep angles of the transmitted and reflected wave between the center axis and each reflecting object present on the corresponding side of the road, each reflecting object having the same distance as the intervehicle distance to the second vehicle; and
   (g) seventh means for outputting a value of the intervehicle distance from the first vehicle to the second vehicle calculated and stored by said third means upon determination of said sixth means that the second vehicle determined by said fifth means is moving in front of the first vehicle on the same traffic lane of the road as the first vehicle.

2. The system according to claim 1, wherein said fourth means determines the traffic lane on which the first vehicle moves on the basis of magnitudes of their sweep angles of the electromagnetic wave between the center axis which accords with the forward movement direction along which the first vehicle moves and reflectors installed on both sides of the road, the reflectors being those located substantially at the same distance with respect to the first vehicle.

3. The system according to claim 1, wherein said sixth means determines the traffic lane of the road on which the second vehicle moves on the basis of magnitudes of respective sweep angles of the electromagnetic wave between the right-side and left-side reflectors located on both sides of the road at the front portion of the first vehicle derived from both predetermined left and right direction limits and having substantially the same distance as the intervehicle distance to the second vehicle and the center axis.

4. The system according to claim 1, which further comprises eighth means for detecting a steering angle of a steering wheel of the first vehicle with respect to an equilibrium position of the steering wheel and wherein the center axis is corrected according to the steering angle detected by said eighth means.

5. The system according to claim 3, wherein said sixth means determines whether the second vehicle moving in front of the first vehicle is moving on the same traffic lane as the first vehicle depending on whether a ratio of both sweep angle magnitudes derived from said fourth means is substantially equal to a ratio of both sweep angle magnitudes derived from said sixth means.

6. The system according to claim 2, wherein said sixth means determines the traffic lane of the road on which the second vehicle moves on the basis of magnitude of respective sweep angles of the electromagnetic wave between the right-side and left-side reflectors located on both sides of the road at the front portion of the first vehicle derived from both predetermined left and right direction limits and having substantially the same distance as the intervehicle distance to the second vehicle and the center axis.

7. A method for detecting an intervehicle distance between first and second vehicles travelling on a road having a plurality of traffic lanes, comprising the steps of:
   (a) transmitting an electromagnetic wave toward a direction along which the first vehicle moves;
   (b) sweeping the transmitted electromagnetic wave from a vehicle forward movement direction to both predetermined left and right directions;
   (c) receiving a reflected wave from a reflecting object on which the transmitted electromagnetic wave falls;
   (d) calculating and storing a distance to the reflecting object on the basis of a propagation delay time between times at which the wave is transmitted and at which the reflected wave is received whenever the transmitted wave is swept at a given angle;

(e) determining on which traffic lane of a road the first vehicle moves on the basis of respective sweep angles of the transmitted and reflected electromagnetic wave between a center axis which accords with the vehicle forward movement direction and wave reflecting objects present on both sides of the road;

(f) determining whether the second vehicle is present on the road along the direction toward which the first vehicle moves from among the wave reflecting objects on the basis of a change in the distance derived for each given sweep angle with respect to time;

(g) determining a traffic lane of the road on which the second vehicle determined in said step (f) moves on the basis of their sweep angles of the transmitted and reflected wave between the center axis and each reflecting object present on the corresponding side of the road, each reflecting object having substantially the same distance as the intervehicle distance to the other vehicle; and (h) outputting a value of the intervehicle distance from the first vehicle to the reflecting object calculated and stored in said step (d) when the reflecting object is the second vehicle which is moving in front of the first vehicle on the same traffic lane of the road as the first vehicle.

* * * * *